United States Patent [19]

Nose et al.

[11] Patent Number: 5,386,945
[45] Date of Patent: Feb. 7, 1995

[54] METHOD FOR CONTROLLING A ROLLER MILL

[75] Inventors: Kazuo Nose, Kobe; Masaki Hamaguchi, Takasago; Toshiyuki Ueda, Takasago; Norio Fukuhara, Takasago, all of Japan

[73] Assignee: Kabushiki Kaisha Kobe Seiko Sho, Kobe, Japan

[21] Appl. No.: 102,988

[22] Filed: Jul. 28, 1993

[30] Foreign Application Priority Data

Jul. 28, 1992 [JP] Japan .................................. 4-201312
Mar. 4, 1993 [JP] Japan .................................. 5-043564
May 21, 1993 [JP] Japan .................................. 5-119464

[51] Int. Cl.⁶ .......................................... B02C 25/00
[52] U.S. Cl. ...................................... 241/30; 241/34; 241/36; 241/37
[58] Field of Search ................... 241/33, 34, 35, 36, 241/37, 30

[56] References Cited

U.S. PATENT DOCUMENTS

| | | | |
|---|---|---|---|
| 3,587,980 | 6/1971 | Henne et al. | 241/34 X |
| 4,184,640 | 1/1980 | Williams | 241/34 |
| 4,640,464 | 2/1987 | Musto et al. | 241/34 |
| 4,754,931 | 7/1988 | Shulof et al. | 241/33 X |
| 4,754,932 | 7/1988 | Kmiotek et al. | 241/33 X |
| 4,830,287 | 5/1979 | Kim | 241/34 X |

FOREIGN PATENT DOCUMENTS

| | | |
|---|---|---|
| 56-155658 | 12/1981 | Japan . |
| 57-140658 | 8/1982 | Japan . |
| 59-49855 | 3/1984 | Japan . |
| 59-142856 | 8/1984 | Japan . |
| 62-33556 | 2/1987 | Japan . |
| 63-348 | 1/1988 | Japan . |
| 63-42746 | 2/1988 | Japan . |
| 63-51953 | 3/1988 | Japan . |
| 63-51954 | 3/1988 | Japan . |
| 63-51955 | 3/1988 | Japan . |
| 63-51956 | 3/1988 | Japan . |
| 1-284344 | 11/1989 | Japan . |
| 2-107346 | 4/1990 | Japan . |
| 2-122848 | 5/1990 | Japan . |

*Primary Examiner*—Timothy V. Eley
*Attorney, Agent, or Firm*—Oblon, Spivak, McClelland, Maier, & Neustadt

[57] ABSTRACT

The present invention provides a roller mill control method capable of automatically controlling a roller mill which is comparatively difficult to operate for operation in an optimum operating condition, and a roller mill controller for carrying out the roller mill control method. The roller mill controller stores beforehand a roller mill characteristic model representing the relation between changes in the values of the operating condition variables detected by a detecting unit (2) and operating parameters, restrictions on the values of the operating condition variables and the operating parameters, an index of performance for evaluating the values of the operating condition variables and the operating parameters. A Simplex algorithm calculation system (5) included in an optimizing control arithmetic unit (3) calculates changes in the operating parameters by a Simplex algorithm by using the roller mill characteristic model, the restrictions and the index of performance to select the values of the operating condition variables detected by the detecting unit (2) so that the index of performance is optimized under conditions meeting the restrictions, and then, a main control unit (4) controls the roller mill on the basis of new operating parameters.

40 Claims, 7 Drawing Sheets

METHOD FOR CONTROLLING A ROLLER MILL

BACKGROUND OF THE INVENTION

1. Field of the Invention

The present invention relates to a method of controlling a roller mill for crushing feedstock of cement, cement clinker or water granulated slug, and a controller for controlling such a roller mill.

2. Description of the Prior Art

The roller mill has the significant advantage over the well-known ball mill that the roller mill is capable of crushing feedstock at a high crushing efficiency (i.e. at a low unit power requirement).

Roller mills are disclosed in Japanese Patent Laid-open (Kokai) Nos. SHO 56-155658 and SHO 57-140658. Hydraulic circuits for use in combination with roller mills are disclosed in Japanese Patent Laid-open (Kokai) Nos. SHO 62-33556, SHO 63-51953, SHO 63-51954, SHO 63-51955, SHO 63-51956 and HEI 2-107346. Separators for roller mills are disclosed in Japanese Utility Model Publication (Kokoku) No. SHO 63-348 and Japanese Patent Laid-open Nos. SHO 59-49855 and SHO 63-42746. A method of regulating the moisture content of feedstock to be processed by the roller mill is disclosed in Japanese Patent Laid-open (Kokai) No. HEI 1-284344. A method of stabilizing the operation of the roller mill is disclosed in Japanese Patent Laid-open No. SHO 59-142856. Roller mills are disclosed in U.S. Pat. Nos. 4,597,537 and 4,611,765.

Figure 7:
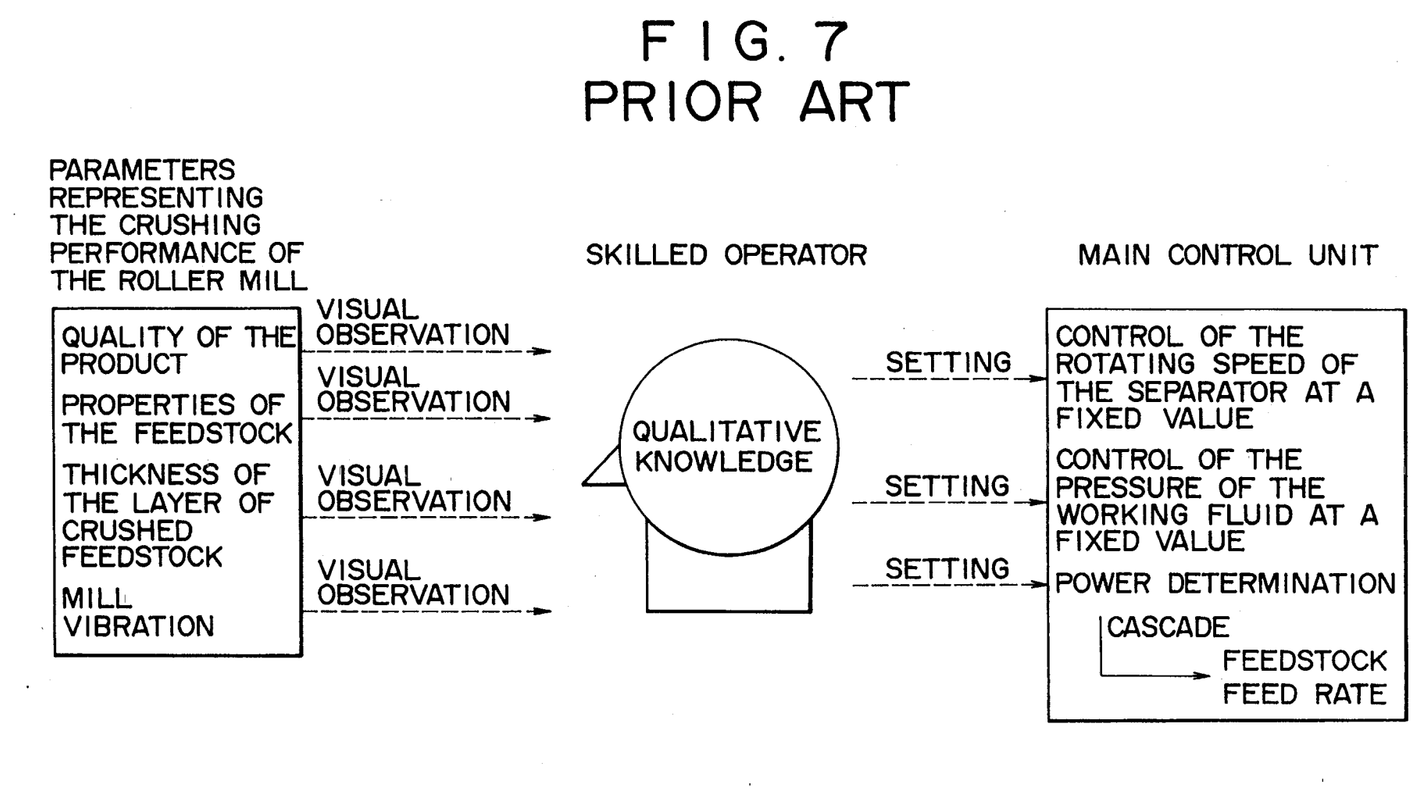
FIG. 7 is a block diagram of assistance in explaining a conventional roller mill control method to be carried out by a skilled operator.

Since the crushing performance of the roller mill is very sensitive to disturbances such as changes in the crushing characteristics of the feedstock, it is difficult to control the crushing operation of the roller mill in accordance with changes in the nature of the feedstock. Therefore, it is current practice to control the operation of the roller mill on the basis of a skilled operator's qualitative judgment of the condition of the feedstock, as shown in Fig. 7. For example, the skilled operator monitors various operating conditions of the mill, such as product quality and mill vibration, and manipulates the values of directly adjustable operating parameters, such as the rotating speed of the separator, pressure of the working fluid of the hydraulic system, supply power, etc. with the aim of thereby indirectly controlling the operating condition of the mill.

If inappropriate operating parameters are selected and set, problems of the type discussed below can occur.

For example, when vibrations of the roller mill become large and the level of vibrations exceeds a predetermined level, a stopping mechanism is tripped to forcibly stop the operation of the roller mill. The quality of the product produced during the first hour after the roller mill has been restarted is not good and unacceptable products are produced. In the worst case, the roller mill could be damaged by excessive vibrations. Accordingly, the operating parameters for the mill must be determined such that the roller mill will not vibrate excessively and such that the roller mill will not be stopped due to excessive vibrations, in order to prevent mill breakdowns and reductions in the product yield.

In some cases, the roller mill is unable to perform to it's full potential, (which is represented by the quantity of feedstock crushed in unit time, power consumption rate, etc.) and inappropriate operating conditions will result in the deterioration of the quality of the product.

To avoid such troubles, the operation of the roller mill must be continuously monitored by a skilled operator, the training of which requires much time and on-the-job experience. Accordingly, it has been desired to develop a control system capable of automatically and properly controlling the roller mill.

A fuzzy control method that uses fuzzy rules to represent the knowledge of skilled operators is disclosed in Japanese Patent Laid-open (Kokai) No. HEI 2-122848. This fuzzy control method is helpful to solve the above problems. However, even this fuzzy control method has difficulty in properly manipulating many operating parameters such as crushing pressure, crushing rate, rotating speed of the separator, air flow, rotating speed of the table, etc.

SUMMARY OF THE INVENTION

Accordingly, it is an object of the present invention to provide a roller mill control method capable of automatically controlling a roller mill which is difficult to control, and a controller for carrying out the roller mill control method.

Another object of the present invention is to provide a roller mill control method capable of creating a continuously up-to-date optimum model of the roller mill, regardless of the time-dependent variation of the working state of the roller mill due to abrasion etc., and a controller for carrying out the roller mill control method.

In a first aspect of the present invention, a roller mill characteristic model representing the relation between changes in the values of the adjustable operating parameters (such as roller pressure, feedstock feed rate, rotating speed of the separator, quantity of hot air, etc.) of the roller mill and variations in the values of the operating condition variables of the roller mill (such as pressure difference, particle size distribution, power requirement, mill vibration, etc.) is formed. The value of each of the operating condition variables is detected repeatedly and the variation in the value of each of the operating condition variables, i.e. the difference between the values of the operating condition variables detected in successive detecting cycles, is applied to the roller mill characteristic model to determine new values for the adjustable operating parameters. In this way, the operation of the roller mill is controlled automatically.

In another aspect of the present invention, values of the operating condition variables of the roller mill are detected repeatedly, and restrictions on the values of the operating condition variables and/or the operating parameters are determined and set beforehand. Then, on the condition that the above-mentioned restrictions are met, and by using an index of performance which evaluates the values of the operating condition variables and/or the operating parameters, new values for the operating parameters are selected (from the plurality of values suggested by the roller mill characteristic model), which optimize the control of the operating condition of the roller mill. In this way, the roller mill can be controlled for optimum operation.

The use of an appropriate roller mill characteristic model, an appropriate restrictions and an appropriate index of performance may optimize the control of the roller mill, In particular, the use of an appropriate roller mill characteristic model reduces the time required for optimization. Consequently, the general readjustment of many operating parameters, which was difficult to achieve by the fuzzy control method, can be achieved and the operating condition of the roller mill can be controlled properly and automatically.

In a further aspect of the present invention, a roller mill characteristic model representing the relation between changes in the values of the adjustable operating parameters of the roller mill and the variation in the values of the operating condition variables of the roller mill is formed. The value of each the operating condition variables is detected repeatedly and the variation in the value of each of the operating condition variables, i.e., the difference between the values of the operating conditions measured in successive measuring cycles, is applied to the roller mill characteristic model to determine new values for the adjustable operating parameters. Then, the roller mill characteristic model is updated according to the new values of the operating parameters and the values of the operating condition variables actually detected after they have been "controlled" by adjusting the values of the operating parameters.

Because the roller mill characteristic model is thus updated in line with any time dependent variation of the working condition of the roller mill and any variation in the properties of the feedstock, an optimum operating condition for the roller mill can be maintained. As a result, the roller mill can be automatically and properly controlled.

Accordingly the time necessary for establishing an optimum operating condition of the roller mill can be reduced greatly by the combined effect of the updating of the roller mill characteristic model in line with the time dependent variation of the working condition of the roller mill and the variation of the properties of the feedstock, and the optimization through the use of the index of performance. Thus the roller mill can be automatically and properly controlled in quick response to any variation in the operating condition of the roller mill or to any variation in the properties of the feedstock.

In a last aspect of the present invention, a model is prepared beforehand representing the relationship between the values of the operating condition variables of the roller mill and the values of the operating parameters of the roller mill. By applying certain values of the operating parameters to the model, corresponding values for the operating condition variables are obtained. The operating conditions of the roller mill are controlled by adjusting the values of the operating parameters such that the actual values of the operating condition variables coincide with the desired values. This model includes a linear expression expressing one of the operating condition variables, for example, particle size as a function of two of the operating parameters, for example, gas quantity and the rotating speed of the separator.

The linear expression enhances the operation speed greatly and, consequently, the roller mill can be accurately controlled in quick response to a variation in the operating conditions of the roller mill.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Preferred embodiments of the present invention will be described hereinafter, however, these embodiments are intended to illustrate the present invention and are not to be construed to limit the scope of the present invention.

Figure 1:
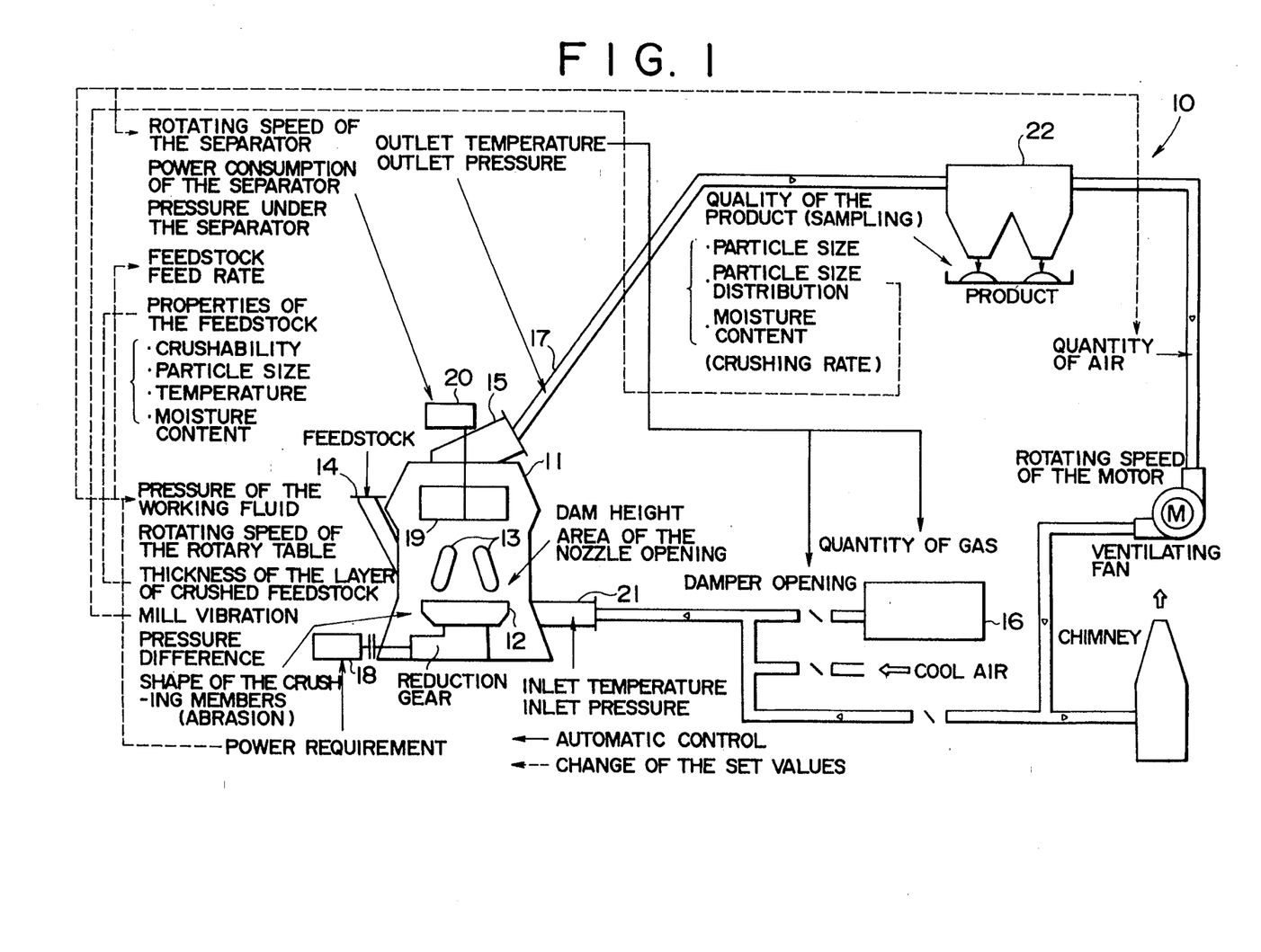
FIG. 1 is a block diagram of a roller mill to be controlled by a roller mill control method in accordance with the present invention.

Referring to FIG. 1 showing a roller mill 10 to be controlled by a roller mill control method in accordance with the present invention, feedstock is charged through a charging opening 14 formed in the side wall of a casing 11 onto a rotary table 12. The feedstock is crushed between the rotary table 12 and rollers 13 which are rotated in cooperation with the rotary table 12. Particles of particle sizes below a predetermined particle size produced by crushing the feedstock are blown upward into the casing 11 by hot air blown through an inlet 21 from a hot blast stove 16. Then, the blown particles are separated into fine particles and coarse particles by a separator 19 rotated by a motor 20 so that only the fine particles are transported by the hot air through an outlet 15 formed in the upper wall of the casing 11, and then they are transported through a duct 17 into a bag filter 22. The fine particles are collected in the bag filter 22 as a product to be expected. The coarse particles separated from the fine particles by the separator 19 fall through the casing 11 onto the rotary table 12 and are subjected again to the crushing actions of the rotary table 12 and the rollers 13. Large particles, which are not blown upward from the rotary table 12 by the hot air, fall onto the bottom of the casing 11 and are discharged through a discharge opening, formed in the bottom wall of the casing 11, into a basket elevator, not shown, and are then returned to a feedstock hopper.

The particle size of the product, i.e., the fine particles collected in the bag filter 22, is measured to determine the particle size distribution of the product. The operating speed of the motor 20 is adjusted so that the rotating speed of the separator 19 is reduced when the particle size of the product is excessively small or the rotating speed of the separator 19 is increased when the particle size of the product is excessively large.

The rotary table 12 is rotated by a reduction gear connected to a motor 18, The mill vibration is measured by a vibration detector mounted on the reduction gear. Since t he components of the roller mill 10 will be damaged if the mill vibration is excessively large, a tripping circuit, not shown, operates to rapidly stop the roller mill 10 at the moment when the mill vibration exceeds, for example, 6 mm/sec.

The values of the operating parameters of the roller mill 10 including the rotating speed of the separator 19 are adjusted, on the basis of data including the mill vibration, representing the operating condition of the roller mill 10, in order to control the operation of the roller mill 10. The present invention is embodied in a roller mill control method of one of the following roller mill control methods [1], [2] and [3].

[1] A roller mill control method which detects repeatedly the value of each operating condition variable (which together represent the overall operating condition of the roller mill), and applies the variation in the value of each operating condition variable i.e. the difference between the detected values of each operating condition variable in successive measuring cycles, to a roller mill characteristic model representing the relationship between variations in the values of the operating condition variables and changes in the values of the operating parameters in order to determine new values for the operating parameters.

[2] A roller mill control method which detects repeatedly the value of each operating condition variable, and then determines new values for the operating parameters so as to optimize an index of performance which evaluates the values of the operating condition variables and/or the values of the operating parameters, under conditions that certain predetermined restrictions on the values of the operating condition variables and/or the values of the operating parameters are met.

[3] A roller mill control method which detects repeatedly the value of each operating condition variable, then applies the variation in the values of the operating condition variables i.e. the difference between the value of each operating condition variable detected in successive measuring cycles, to a roller mill characteristic model representing the relationship between variations in the values of the operating condition variables and changes in the values of the operating parameters, and then, on the condition that certain predetermined restrictions on the values of the operating condition variables and/or the operating parameters are met, and by using an index of performance, which evaluates the values of the operating condition variables and/or the operating parameters, selects new values for the operating parameters (from the plurality of values suggested by the roller mill characteristic model).

Figure 2:
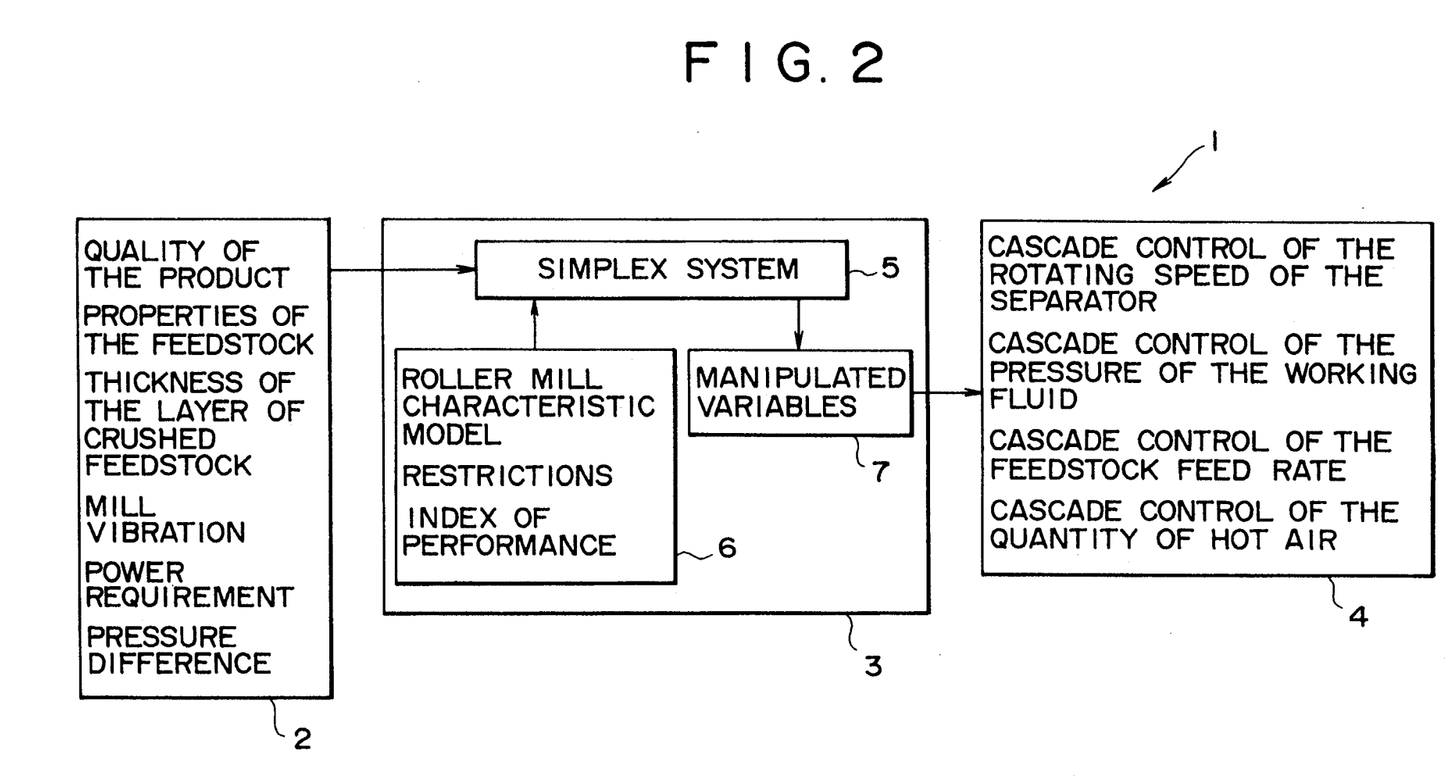
FIG. 2 is a block diagram of a roller mill controller in a first embodiment according to the present invention for controlling the roller mill of FIG. 1.

The roller mill control method [3], of the foregoing roller mill control methods [1], [2] and [3], can be carried out by a roller mill controller 1 in a first embodiment according to the present invention for controlling the roller mill 10 described herein. As shown in FIG. 2, the roller mill controller 1 comprises a detecting unit 2 comprising a plurality of detectors, not shown, for measuring the properties of the feedstock including grain size and hardness, the thickness of the layer of the crushed feedstock formed on the rotary table 12, the mill vibration, the power requirement of the motor 18, the pressure difference, and other factors including particle size and particle size distribution, indicating the quality of the product; an optimizing control arithmetic unit 3 which embodies (i) the roller mill characteristic model expressing the relationship between variations in values of the operating condition variables (pressure difference, particle size distribution of the product, power requirement and mill vibration, etc.) and changes in the operating parameters (roller pressure, feedstock feed rate, rotating speed of the separator, quantity of hot air, etc.), (ii) the predetermined restrictions on the values of the operating condition variables and values of the operating parameters, and (iii) an index of performance which evaluates the values of the operating condition variables and/or the values of the operating parameters, and which through use of a mathematical method, such as the Simplex method, selects new values from these sets of values suggested by the model for the operating parameters which optimize the index of performance provided that the conditions concerning the above-mentioned restrictions on the values of the operating condition variables and/or the values of the operating parameters are met; and a main control unit 4 which adjusts the values of the operating parameters in accordance with the operating parameters optimized by optimizing control arithmetic unit, thereby controlling the operating conditions of the roller mill 10. Roller mill controllers capable of carrying out the roller mill control methods [1] and [2] are similar to the first roller mill controller and hence the description thereof shall be omitted.

A logical operating mode of the roller mill controller 1 for controlling the roller mill 10 will be described hereinafter by way of example.

Roller Mill Operating Parameters $x_1$: Roller pressure (%) (Pressure of the working fluid) A low roller pressure is preferable.

$x_2$: Feedstock feed rate (t/hr) A high feedstock feed rate is preferable.

$x_3$: Rotating speed of the separator (rpm)

$x_4$: Quantity of hot air (m³/min.)

Roller Mill Operating Condition Variables $y_1$: Mill pressure difference (mm aq.) Specified value $y_2$: Particle size distribution of product (%) Specified value $y_3$: Power requirement (kW) Low power requirement is preferable.

$y_4$: Mill vibration (mm/sec) Low mill vibration is preferable.

The roller mill characteristic model is represented by the following expression (1)

$$\begin{pmatrix} \Delta y_1 \\ \Delta y_2 \\ \Delta y_3 \\ \Delta y_4 \end{pmatrix} = \begin{pmatrix} a_{11} a_{12} a_{13} a_{14} \\ a_{21} a_{22} a_{23} a_{24} \\ a_{31} a_{32} a_{33} a_{34} \\ a_{41} a_{42} a_{43} a_{44} \end{pmatrix} \begin{pmatrix} \Delta x_1 \\ \Delta x_2 \\ \Delta x_3 \\ \Delta x_4 \end{pmatrix} \quad (1)$$

Where $\Delta x_1$ to $\Delta x_4$ are the changes in the values of the operating parameters, $x_1$ to $x_4$ and $\Delta y_1$ to $\Delta y_4$ are the variations of the values of the operating condition variables, $y_1$ to $y_4$. The elements $a_{11}$ to $a_{44}$ of the expression (1) are co-efficients determined by sampling the values of the operating parameters and the values of the operating condition variables in sampling cycles executed at a fixed sampling interval in a predetermined period, calculating the respective time averages of the values of the operating parameters and the operating condition variables on the basis of the sampled data, and then processing the time averages by multiple regression analysis. The afore-mentioned restrictions are represented by the following expressions.

$$0 \leq x_1 + \Delta x_1 \leq 300 \quad (2)$$

$$0 \leq x_2 + \Delta x_2 \quad (3)$$

$$0 \leq x_3 + \Delta x_3 \quad (4)$$

$$0 \leq x_4 + \Delta x_4 \leq 270 \tag{5}$$

$$250 \leq y_1 + \Delta y_1 \leq 300 \tag{6}$$

$$18 \leq y_2 + \Delta y_2 \leq 22 \tag{7}$$

$$0 \leq y_3 + \Delta y_3 \leq 175 \tag{8}$$

$$0 \leq y_4 + \Delta y_4 \leq 6 \tag{9}$$

The index P of performance is represented by the following expression.

$$P = 30(y_3 - 175)/175 + 50y_4/6) = 30(x_1/100) = 30(7 - x_2)/7 \tag{10}$$

Values for $Y_3$, $Y_4$, $x_1$ and $x_2$ are chosen so as to minimize the index P of performance.

$$P \rightarrow \text{Min(Minimum)} \tag{11}$$

The expressions (1) to (10) representing the roller mill characteristic model and the restrictions are determined beforehand and stored in a memory 6 included in the optimizing control arithmetic unit 3.

The optimizing control arithmetic unit 3 has a Simplex algorithm calculation system 5 provided with a central processing unit (CPU) as a principal component. A Simplex algorithm, i.e., the algorithm of a mathematical planning method, is stored in a ROM, not shown. The simplex system 5 determines the variations $\Delta y_1$ to $\Delta y_4$ of the values of the operating condition variables from the values of the same sampled in the preceding sampling cycle by the detectors of the detecting unit 2, and applies the variations $\Delta y_1$ to $\Delta y_4$ to the roller mill characteristic model to determine variations $\Delta x_1$ to $\Delta x_4$ for the values of the operating parameters. There are many combinations of variations of each operating parameter that would result in the desired operating condition for the roller mill. The Simplex algorithm calculation system 5 selects those values $x_1 = \Delta x_1$ to $x_4 = \Delta x_4$ for the operating parameters which optimize the index of performance, P, under condition that the restrictions are met, and gives the selected new values to an output unit 7. The output unit 7 gives variations $\Delta x_1$ to $\Delta x_4$ of operating parameters to the main control unit 4, and then the main control unit 4 adjusts the values of the operating parameters on the basis of the variations $\Delta x_1$ to $\Delta x_4$, thereby controlling the roller mill 10 in an optimized condition.

Another example of the logical operating mode of the roller mill controller 1 will be described hereafter.

In this logical operating mode, the roller mill controller deals with dimensionless values, i.e., ratios of changes of the values each of the parameters to the actual values of the same and the ratios of changes of the values each of the condition variables to the actual values of the same, instead of dealing with the actual values of the operating parameters and the operating condition variables, and actual changes in the values of the operating parameters and operating condition variables, and uses the medians of the allowable ranges.

Roller Mill Operating Parameters $x_1$: Roller pressure (kgf/cm$^2$) (Pressure of the working fluid) A lower roller pressure is preferable.

$x_2$: Feedstock feed rate (t/hr) A higher feedstock feed rate is preferable.

$x_3$: Rotating speed of the separator (rpm)

$x_4$: Quantity of hot air (m$^3$/min.)

Roller Mill Operating Condition Variables $y_1$: 90%-Pass particle size ($\mu$) The median of the allowable range is desirable.

$y_2$: Power requirement (kW) Less power requirement is preferable.

$y_3$: Mill vibration (mm/sec) Less mill vibration is preferable.

The roller mill characteristic model is represented by the following expression (12).

$$\begin{pmatrix} \Delta' y_1 \\ \Delta' y_2 \\ \Delta' y_4 \end{pmatrix} = \begin{pmatrix} a_{11} a_{12} a_{13} a_{14} \\ a_{21} a_{22} a_{23} a_{24} \\ a_{31} a_{32} a_{33} a_{34} \end{pmatrix} \begin{pmatrix} \Delta' x_1 \\ \Delta' x_2 \\ \Delta' x_3 \\ \Delta' x_4 \end{pmatrix} \tag{12}$$

where $\Delta'x_1$ to $\Delta'x_4$ are the ratios of the changes $\Delta x_1$ to $\Delta x_4$ of the values of operating parameters $x_1$ to $x_4$ to the actual values of the operating parameters $x_1$ to $x_4$, respectively, and $\Delta'y_1$ to $\Delta'y_4$ are the ratios of the variations $\Delta y_1$ to $\Delta y_3$ of the values of the operating condition variables $y_1$ to $y_3$ to the actual values of the operating condition variables, respectively. The elements $a_{11}$ to $a_{34}$ of the expression (12) are co-efficient determined by sampling the values of the operating parameters and the values of the operating condition variables in sampling cycles executed at a fixed sampling interval in a predetermined period, and then calculating the respective time averages of the values of the operating parameters and those of the operating condition variables, and finally processing the time averages using multiple regression analysis. The afore-mentioned restrictions are represented by the following expressions (13) to (19).

$$100 \leq x_1 + x_1\Delta'x_1 \leq 150 \tag{13}$$

$$100 \leq x_2 + x_2\Delta'x_2 \leq 140 \tag{14}$$

$$60 \leq x_3 + x_3\Delta'x_3 \leq 80 \tag{15}$$

$$4200 \leq x_4 + x_4\Delta'x_4 \leq 4800 \tag{16}$$

$$39.42 \leq y_1 + (y_1 - b)\Delta'y_1 \leq 41.41 \tag{17}$$

$$2400 \leq y_2 + y_2\Delta'y_2 \leq 3000 \tag{18}$$

$$0 \leq y_3 + y_3\Delta'y_3 \leq 6 \tag{19}$$

where b is a constant.

An index $P_1$ of performance is represented by the following expression (20).

$$P_1 = -100(x_2 + x_2)/130 - 100(y_2 + y_2\Delta'y_2)/3000 + 50 - (y_3 + y_3\Delta'y_3)/3 + 50(y_1 - b)\Delta'y_1 - C)/40 \tag{20}$$

where C is the median of the allowable range for $y_1$, for example, C = (39.42 + 41.41)/2. The values of $y_1$, $y_2$, $y_3$ and $x_2$ are determined so as to minimize the index $P_1$ of performance.

$$P_1 \rightarrow \text{Min(Minimum)} \tag{21}$$

The roller mill characteristic model, the restrictions and the index of performance, P1, represented by the expressions (12) to (20) are determined beforehand and stored in the memory 6 of the optimizing control arithmetic unit 3.

The Simplex algorithm calculation system 5 of the optimizing control arithmetic unit 3 calculates the ratios $\Delta'y_1$ to $\Delta'y_3$ of the variations of the values of the operating condition variables to actual values of the same detected in the preceding sampling cycle by the detectors of the detecting unit 2, applies the ratios $\Delta'y_1$ to $\Delta'y_3$ to the roller mill characteristic model to determine the ratios $\Delta'x_1$ to $\Delta'x_4$ of the changes of the operating parameters to the actual values of the same. The simplex system 5 selects new values $x_1(1+\Delta'x_1)$ to $x_4(1+\Delta'x_4)$ to optimize the index of performance, $P_1$, under the condition that the above restrictions are met, and gives the new values for the operating parameters to the output unit 7. Then, the output unit 7 determines changes $\Delta x_1$ to $\Delta x_4$ for the operating parameters and gives the same to the main control unit 4. The main control unit 4 changes the present values of the operating parameters by the amounts $\Delta x_1$ to $\Delta x_4$ in order to optimize the operating condition of the roller mill 10. As well as achieving proper control of the roller mill, because in this example the variations and parameters are dimensionless, calculations involving these values are easily handled and these values can be easily set at the medium of the corresponding allowable ranges. Therefore, the roller mill 10 can be stably controlled under conditions meeting the restrictions.

In either of the above two logical operating modes, the roller mill control method uses an index of performance together with certain restriction conditions to select optimum values for the operating parameters and thereby optimize the control of the mill (See roller mill control method [3]). However in the practical application of the present invention, the roller mill control method may, as in roller mill control method [1], control the roller mill 10 by using only the roller mill characteristic model without using the aforementioned index of performance. Such a roller mill control method is a simple, basic automatic control method, which is sufficiently effective when the operating conditions of the roller mill 10 vary within a comparatively narrow range.

The roller mill control method may, as in roller mill control method [2], control the roller mill 10 just through the optimization of the values of the operating parameters by using the index of performance and the restriction conditions without using the aforementioned roller mill characteristic model. This roller mill control method is able to optimize the operation of the roller mill 10 and hence, in this method, the power consumption of the roller mill 10 is able to be reduced.

The roller mill control method [3] is the combination of the roller mill control methods [1] and [2] and utilizes the synergetic effects of the roller mill control methods [1] and [2] to achieve further improved control operation, that is, the use of an appropriate roller mill characteristic model enables the roller mill controller to optimize the operating condition of the roller mill 10 more quickly. Thus, the values of the operating parameters including roller pressure, crushing rate, rotating speed of the separator and quantity of hot air, which are difficult to control by the conventional fuzzy control method, can be adjusted and the operating condition of the roller mill 10 can be automatically and properly controlled.

Another roller mill control method in a second embodiment according to the present invention for controlling the foregoing roller mill 10 will be described hereinafter.

Figure 3:
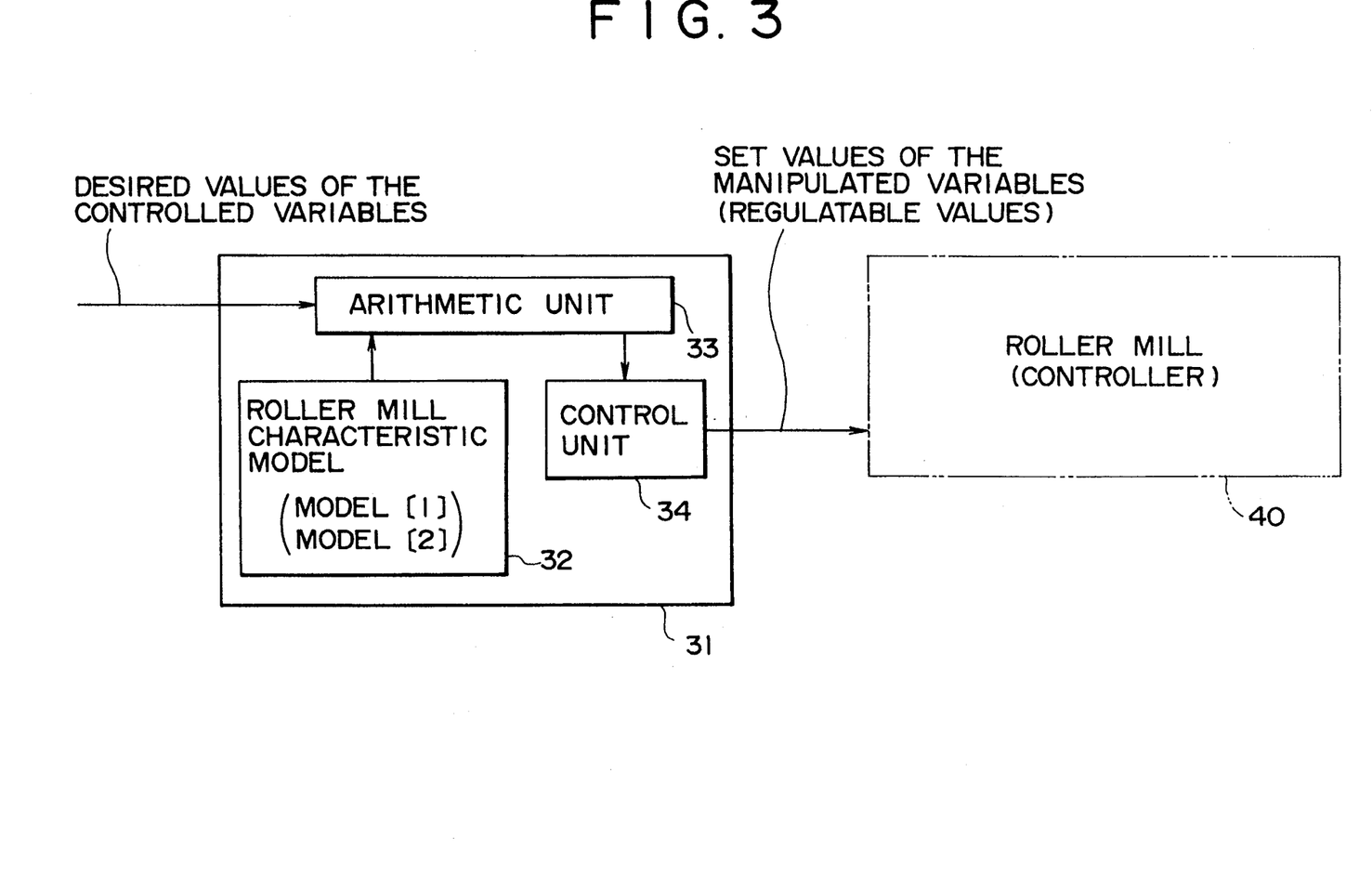
FIG. 3 is a block diagram of a roller mill controller in a second embodiment according to the present invention for controlling the roller mill of Fig. 1.

This roller mill control method is analogous with the foregoing roller mill control method in that it uses a roller mill characteristic model to represent the relationship between the values of the operating condition variables of the roller mill 10 and the values of the operating parameters of the roller mill, then applies the values of some of the operating parameters to the roller mill characteristic model to determine the values of the corresponding operating condition variables, and then adjusts the values of the operating parameters so that the values of the operating condition variables coincide with the desired values. This roller mill control method differs from the foregoing roller mill control method in that (a) it uses a roller mill characteristic model including a linear expression expressing one of the operating condition variables, particle size, as a function of two of the operating parameters, quantity of hot air and rotating speed of the separator, (b) it uses a model incorporating operating condition variables other than particle size, for multiple regression analysis, and (3) it nondimensionalizes the operating parameters.

The roller control method in the second embodiment is carried out by a roller mill controller 31 capable of controlling the roller mill 10. Referring to FIG. 3, the roller mill controller 31 comprises a memory 32 storing a roller mill characteristic model representing the predetermined relation between the operating condition variables of the roller mill 10 (pressure difference, particle size distribution of the product, power requirement, mill vibration, etc.) and the operating parameters of the roller mill 10 (roller pressure, feedstock feed rate, the rotating speed of the separator and the quantity of hot air, etc.); an arithmetic unit 33 which, by using the roller mill characteristic model, calculates values of the operating condition variables corresponding to values of the operating parameters entered by operating a keyboard, not shown; and a control unit 34 which adjusts the values of some of the operating parameters so that the values of the operating condition variables calculated by the arithmetic unit 33 coincide with the desired values thereby controlling the operating condition of the roller mill 10.

The roller mill characteristic model comprises a model [1] representing, by a linear expression, the relation between particle size distribution (90%-pass particle size), i.e., particle size data, and the rotating speed of the separator and the quantity of hot air corresponding to the particle size distribution, and a model [2] using multiple regression analysis to represent the relation between the operating condition variables other than particle size and the values of the corresponding operating parameters. The components 32, 33 and 34 handle the roller mill characteristic model including the models [1] and [2].

A procedure for the development of the model [1] included in the roller mill characteristic model will be described hereafter.

The relation between the values of the operating parameters (the rotating speed of the separator and the quantity of hot air) of the roller mill 10 and particle size (particle size distribution of the product) is expressed by the following well-known classifying point calculating formula. By using this formula, classified particle size (90%-pass particle size) can be calculated, under conditions that other mechanical conditions are constant, from the rotating speed of the separator and the quantity of hot air.

$$d = k \times Q/H \times R^{-5/3} \times N_0^{-4/3} \quad (31)$$

where d is classified particle size (μm), 0 is the actual quantity of hot air supplied to the separator (m...sec), H is rotor height (m), R is rotor radius (m), $N_0$ is the rotating speed of the rotor (rpm) (=9.07N, N is the rotating speed of the separator) and K is a constant.

The formula (31) is modified into the form of a linear expression having the actual quantity Q of hot air supplied to the separator and the rotating speed N of the separator as variables so that it may be handled by the arithmetic unit 33. The constants, k,H and R, of the formula (31) and a conversion factor for converting the rotating speed $N_0$ of the rotor into the rotating speed N of the separator are combined together in the single constant k'. In the following formula (32), the both sides of the formula are expressed as natural logarithm of the formula (31).

$$ln\ d = ln(k'.Q.N^{-4/3}) \quad (32)$$

The formula (32) is also effective in the case that the variables d,Q and N of the formula (32) are varied. Therefore, $$ln(d+\Delta d) = ln\ k'.(Q+\Delta Q).(N+\Delta N)^{-4/3} \quad (33)$$

Subtracting both sides of the expression (31) from both sides of the expression (32) and rearranging the difference according to logarithmic rules, we obtain:

$$ln(1+\Delta d/d) = ln(1+\Delta Q/Q) - (4/3)ln(1+\Delta N/N) \quad (34)$$

Expanding the expression (34) in series and omitting the second order term and the following higher order terms on the assumption that changes in the variables are very small, we obtain:

$$\Delta d/d = (\Delta Q/Q) - (4/3)(\Delta N/N) \quad (35)$$

A classified particle size d, determined by applying values of the quantity of hot air, Q and the rotating speed of the separator, N to the expression (35), and a 90%-pass particle size determined through the Cilas analysis of the actual product were compared.

Figure 4:
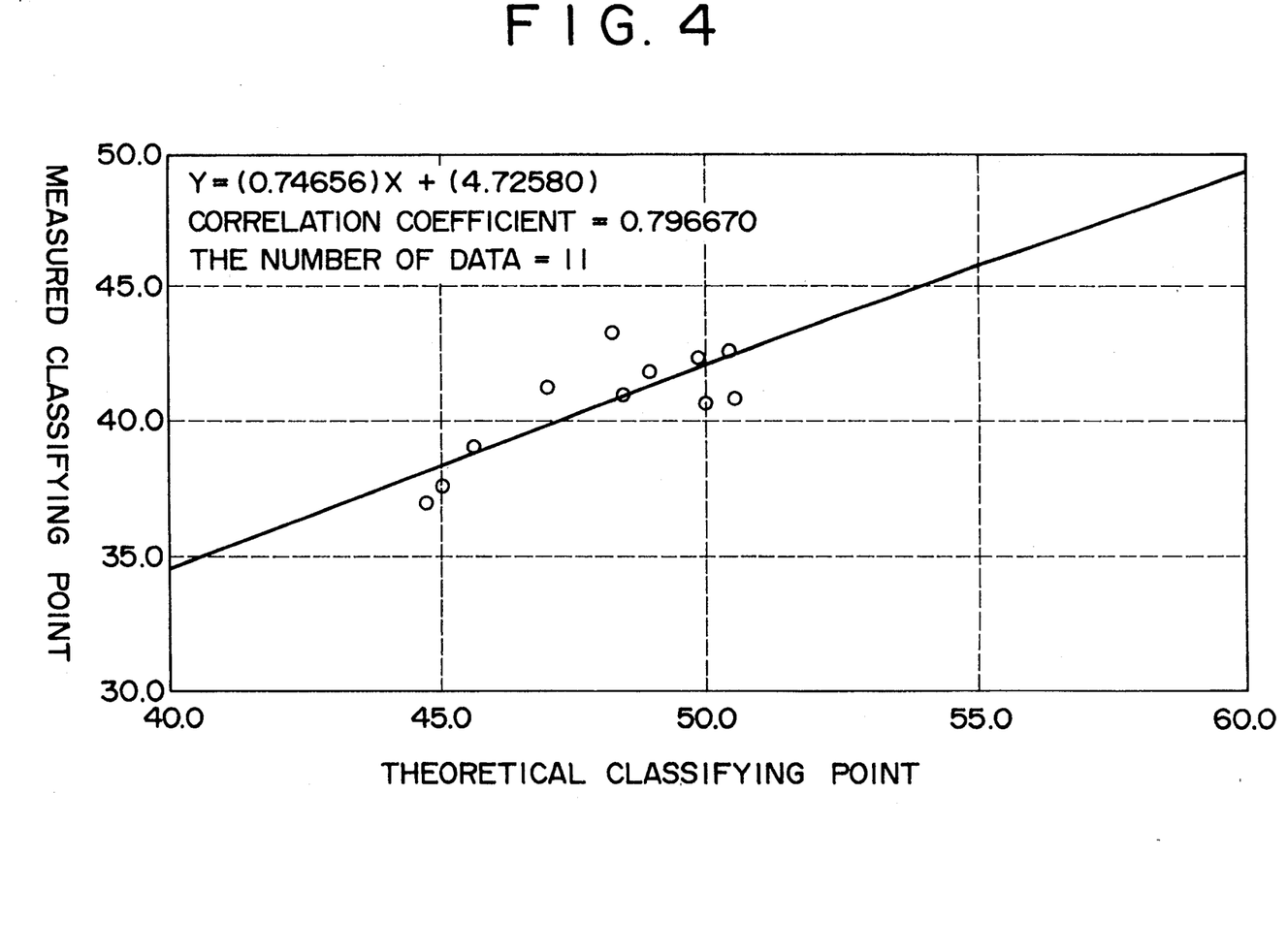
FIG. 4 is a graph comparatively showing calculated classifying points and experimental classifying points.

Data of samples sampled in a predetermined time after the stoppage of the roller mill 10 was extracted from the daily report and was subjected to single regression analysis. As shown in FIG. 4, the correlation coefficient representing the correlation between the measured values and the theoretical values was as large as 0.796670 for the data acquired in a period five hours or more after the stoppage of the roller mill 10.

The expression (35) is revised by using an expression representing the relation between the classified particle size d determined through single regression analysis using the expression (35), and the classified particle size obtained through the well-known Cilas analysis of the actual product.

The following single regression expression is used for generalization.

$$d = a.d' + b \quad (36)$$

where d is the measured classified particle size obtained through Cilas analysis of the actual product, d' is the theoretical classified particle size calculated by using the expression (35), and a and b are coefficients. The model [1] included in the roller mill characteristic model is obtained by substituting the expression (36) into the expression (35).

$$\Delta d/(d-b) = (\Delta Q/Q) - (4/3)(\Delta N/N) \quad (37)$$

Since the variables included in the expression (37), which are obtained by dividing the changes of the variables by the present values of the variables, are dimensionless, the present value of the 90%-pass particle size is necessary when using expression (37). The particle size distribution of the product may be determined through extrapolation by using well-known Rosin-Rammler distribution law on the basis of 32μ-pass percentage and 8μ-pass percentage most strongly correlated with the AJS 30 μ-residue value and Blaine value, respectively.

A procedure for developing the model [2] included in the roller mill characteristic model will be described hereafter.

Partial regression coefficients can be determined for the model [2] by expressing the relation between the operating condition variables $y_i$ (i is a natural number) other than the particle size distribution and the corresponding operating parameters $x_j$ by a function and subjecting the function to multiple regression analysis. The variables $y_i$ and $x_j$ are nondimensionalized in the following manner.

$$\Delta'x_j = \Delta x_j/x_j = (x_{j=1} - x_j)/x_j \quad (38)$$

$$\Delta'y_i = \Delta y_i/y_i = (y_{i+1} - y_i)/y_i \quad (39)$$

The model [2] is expressed as follows using the dimensionless variables $\Delta'x_j$ and $\Delta'y_i$ $$\Delta'y_i = a_{ij}\Delta'x_j \quad (40)$$

where $a_{ij}$ are partial regression coefficients.

An example operation of the roller mill controller 1 which uses the roller mill characteristic model including the models [1] and [2] for controlling the roller mill 10 will be described hereinafter.

Roller Mill Operating Parameters
$x_1$: Feedstock feed rate (t/hr)
$x_2$: Roller pressure (Working fluid pressure) (kgf/cm$^2$)
$x_3$: Rotating speed of the separator (rpm)
$x_4$: Quantity of hot air (m$^3$/min.)
Roller Mill Operating Condition Variable
$y_1$: 90%-pass particle size (m)
$y_2$: Power requirement (kW)
$y_3$: vibration (mm/sec)

The models [1] and [2] are expressed by the following expressions obtained by substituting the operating parameters $x_1$ to $x_4$ and the operating condition variables $y_1$ to $y_3$ into the expressions (37) to (40).

Model [1]
$$\Delta'y_1 = \Delta'x_4 - (4/3)\Delta'x_3 \quad (41)$$

Model [2]
$$\begin{pmatrix} \Delta'y_2 \\ \Delta'y_3 \end{pmatrix} = \begin{pmatrix} a_{11} & a_{12} \\ a_{21} & a_{22} \end{pmatrix} \begin{pmatrix} \Delta'x_1 \\ \Delta'x_2 \end{pmatrix} \quad (42)$$

The models [1] and [2] expressed respectively by the expressions (41) and (42) are stored beforehand in a memory 32.

An arithmetic unit 33 has a central processing unit (CPU) as a principal component. Mathematics algorithms including Simplex algorithm are stored in a ROM, not shown. The arithmetic unit 33 performs computation by using the roller mill characteristic model (including models [1] and [2]) stored in the memory 32. A control unit 34 adjusts the values of the operating parameters according to calculated data provided by the arithmetic unit 33 in order to control the operating condition of the roller mill 10.

As mentioned above, the roller mill characteristic model representing the characteristics of the roller mill 10 includes model [1] in the form of a linear expression representing one of the operating condition variables, the particle size (particle size distribution of the product), as a function of two of the operating parameters, quantity of hot air and rotating speed of the separator. This linear expression can be obtained by approximating a classifying point calculating formula, i.e., a well-known model expressing particle size distribution. The sufficiently high reliability of the linear expression was confirmed by afore-mentioned experiments and, consequently, the reliability of the roller mill controller in controlling the operating condition of the roller mill 10 can be assured. Furthermore, the linear expression enhances the speed of computation.

The roller mill characteristic model also includes the model [2] which uses multiple regression analysis to represent the operating condition variables other than particle size. The reduction of the number of objects to be subjected to multiple regression analysis, which requires many steps of calculation, enhances the speed of computation and minimizes computing errors.

Still further, since the variables of the models [1] and [2] are dimensionless, the computation of the variables is simplified and the speed of computation is enhanced particularly in the case of the multiple regression analysis.

Accordingly, the roller mill can be quickly and accurately controlled by the roller mill control method using the models [1] and [2].

When the variables include some which are not strongly related with each other, the models [1] and [2] constituting the roller mill characteristic model may be further divided into component models.

Although a control mode in which the roller mill controller 31 controls the roller mill 10 by just using the roller mill characteristic model has been described above, in the practical application of the roller mill controller 31, the roller mill controller 31 can also use restriction conditions and an index of performance with respect to the values of the operating parameters and the operating condition variables in addition to using the roller mill characteristic model, and then apply the Simplex Method to the mathematics algorithms to control and optimize the operating condition of the roller mill 10. When the afore-mentioned optimization is unnecessary, the model [1] may be expressed by a classifying point calculating method or an expression of higher order.

The aforementioned roller mill characteristic model employed in the roller mill control method embodying the present invention is created beforehand using multiple regression analysis and is undynamic. However in fact, the operating conditions of the roller mill 10 vary with time, as does the crushing performance of the roller mill 10 which changes due to the abrasion of the crushing components. The properties of the feedstock are also variable. The roller mill 10 can be maintained in an optimum operating condition by updating the roller mill characteristic model in line with the variation of the operating condition of the roller mill 10 and the variation of the properties of the feedstock.

The present invention may be embodied in either of the following roller mill control methods [4] and [5].

[4] A roller mill control method which repeatedly detects each of the values of the roller mill operating condition variables, then applies the variation of the value of each operating condition variable, i.e., the difference between the values of each operating condition variable detected in successive detecting cycles, to a roller mill characteristic model expressing the predetermined relationship between the variation of the operating condition variables and the values of the operating parameters to determine new values for the operating parameters, and then updates the roller mill characteristic model on the basis of the values of the operating condition variables detected after attempting to control the roller mill by setting the new selected values of the operating parameters, and the new selected values of the operating parameters,

[5] A roller mill control method which repeatedly detects each of the values of the operating condition variables, then applies the variation of each operating condition variable, i.e., the difference between the values of the operating condition variable detected in successive detecting cycles, to a roller mill characteristic model expressing the predetermined relationship between the variations of the operating condition variables and the changes in the values of the operating parameters to determine new values for the manipulated variables, selects new values, from the plurality of values suggested by the characteristic model, for the operating parameters by using an index of performance which evaluates the values of the operating condition variables and/or the values of the operating parameters, under the condition that the predetermined restrictions on the values of the operating condition variables and/or the values of the operating parameters are met, and then updates the roller mill characteristic model on the basis of the values of the operating condition variables detected after attempting to control the operation of the roller mill by setting the new selected values of the operating parameters, and the selected new values of the operating parameters.

Figure 5:
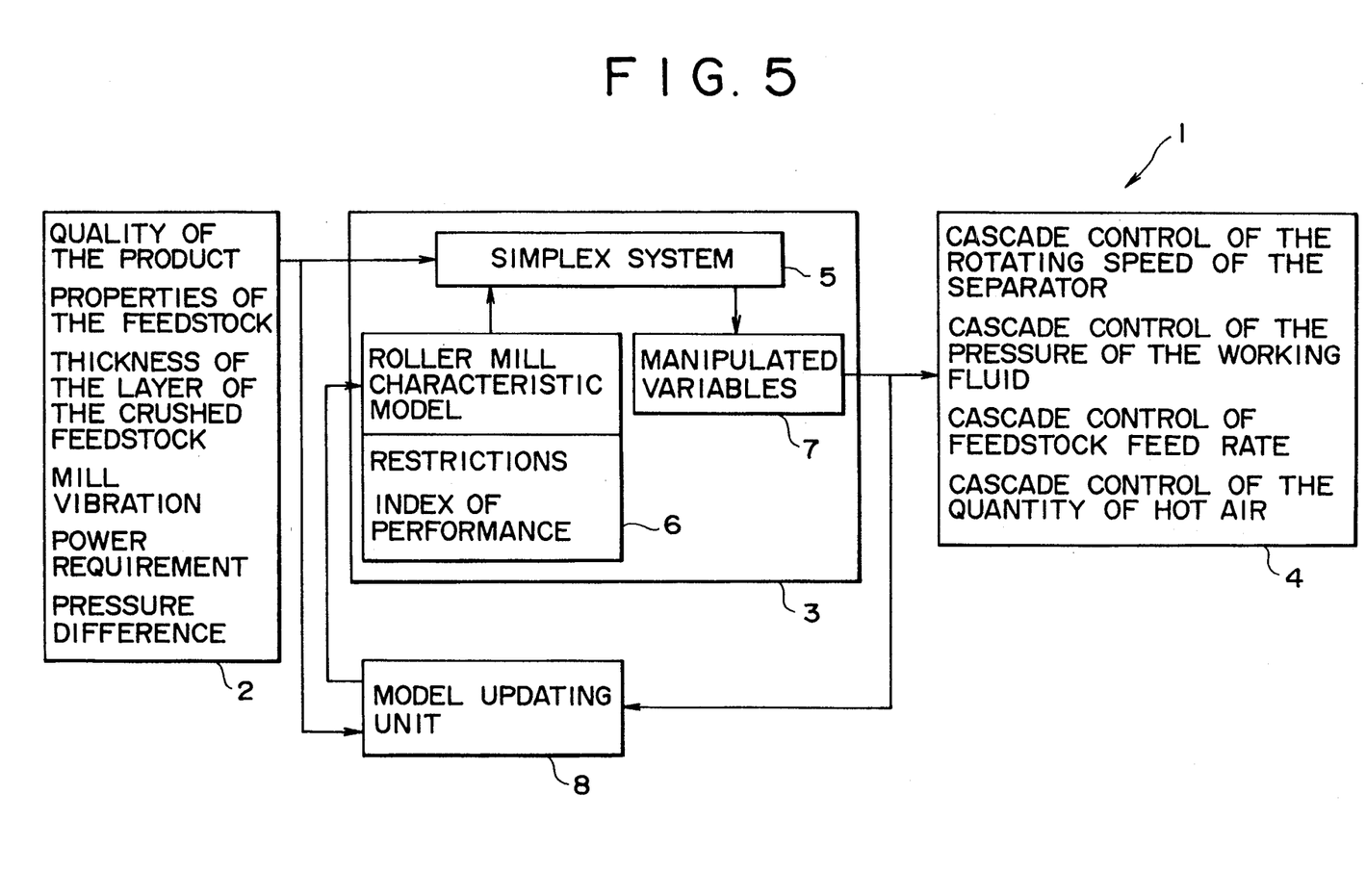
FIG. 5 is a block diagram of a roller mill controller in a third embodiment according to the present invention for controlling the roller mill of Fig. 1.

The roller mill control method [5] is carried out by a roller mill controller 1'. As shown in FIG. 5, the roller mill controller 1'is provided with, in addition to the components of the roller mill controller 1 in the first embodiment, a model updating unit 8 for updating the roller mill characteristic model. The roller mill control method [4] can be carried out by a roller mill controller similar to the roller mill controller 1'and hence the description of the roller mill controller for carrying out the roller mill control method [4] will be omitted.

A typical example of logical operating mode in which the roller mill controller 1'operates will be described hereinafter.

This embodiment of the invention updates the roller mill characteristic model by using a Kalman Filter to estimate the operating condition of the roller mill.

Roller Mill Operating Parameters
$x_1$: Roller pressure (Working fluid pressure)
$x_2$: Crushing rate
$x_3$: Rotating speed of the separator
$x_4$: Quantity of hot air x₅: Rotating speed of the rotary table Roller Mill Operating Condition Variables y₁: Blaine value
y₂: AJS 30 μresidue value
y₃: Crushing rate/power requirement
y₄: Pressure difference
y₅: Thickness of the layer of crushed feedstock
y₆: Range of the variation of the thickness of the layer of crushed feedstock Then, the roller mill characteristic model is expressed by the following determinant:

$$\Delta y_i = \sum_{j=1}^{5} a_{ij} \Delta x_j \quad (i = 1 \text{ to } 6) \quad (22)$$

where $\Delta x_j$ represents changes in the values $x_j$ (j=1 to 5) of the operating parameters, and $\Delta y_i$ represents changes in the values of the operating condition variables $y_i$ (i=1 to 6). The elements $a_{ij}$ of the expression (22) are coefficients obtained by calculating the time averages of the values of the operating parameters and the values of the operating condition variables sampled at sampling times in a predetermined period and by then subjecting the time averages to multiple regression analysis. Restrictions are expressed by the following expressions.

Particle size restriction: $c_i + \epsilon_i \leq y_i + \Delta y_i \leq d_i - \epsilon_i$ (i=1 or 2) (23)

Unit requirement restriction: $y_3 + \Delta y_3 \leq e_3 + \epsilon_3$ (24)

Vibration restriction: $g_k \leq f_k(x_k + \Delta x_k) \leq h_k$ (k=1 to n) (25)

where $c_i$ $d_i$ $e_3$, $g_k$ and $h_k$ are user supplied values, $\epsilon_3$ is model error, and $f_k$ is a function for a nonlinear optimization method incorporating inequality restrictions (repetitive calculation).

The index of performance is represented by a function P₂ expressed by the following expression.

$$P_2 = \sum_{i=3}^{6} W_i(y_i + \Delta y_i) \quad (26)$$

where $w_i$ represents weights, which are user supplied values. The weights can be properly set by the operator according to the actual operating condition of the roller mill in order to preserve a certain degree of freedom of operation for the operator.

The values $\Delta x_j$ (j=1 to 6) are determined so that the index of performance, P₂ is maximized.

P₂→Max (Maximization) (27)

In this embodiment, the restrictions expressed by the expressions (23) to (25) of the roller mill characteristic model, and the index P₂ of performance are stored beforehand in a memory 6 included in an optimizing control arithmetic unit 3.

A Simplex algorithm calculation system 5 included in the optimizing control arithmetic unit 3 calculates variations Δy_i by subtracting the values of the operating condition variables detected by the detecting unit 2 in the succeeding sampling cycle from the values of the corresponding operating condition variables detected by the detecting unit 2 in the preceding sampling cycle, and applies the variations Δy_i to the roller mill characteristic model to determine variations Δx_j of the operating parameters. The Simplex algorithm calculation system 5 selects new values for the operating parameters:

$x_j^{new} = x_j^{old} + \alpha_j \Delta x_j$ (j.gain) so as to optimize the index of performance, P₂ under condition that the restrictions are met, and gives the selected new values to an output unit 7. Then, the output unit 7 determines changes $\alpha_j \Delta x_j$ for the new values $x_j^{new}$ and gives the same to a main control unit 4. The gains $\alpha_j$ are user supplied values. Then, the main control unit 4 adjusts the present values of the operating parameters on the basis of the changes $\alpha_j \Delta x_j$ provided by the output unit 7, and updates the roller mill characteristic model on the basis of the values $y_i^{new}$ new of the operating condition variables and the new values xjnew of the operating parameters When updating the roller mill characteristic model, sequential approximation is applied to the identification of the parameters by the well-known least squares method, which is equivalent to the application of the standard Kalman filter to a system equation in which unknown parameters are regarded as state variables for state estimation. Accordingly, as is generally known, the solution is:

$$a'(N-1)-K(N)\{x^T(N).a'(N-1)-y(N)\} \quad (28)$$

$$K(N)=P(N-1)x(N)\{+x^T(N)P(N1)\times(N)\}^{-1} \quad (29)$$

$$P(N)=\{1-K(N)x^T(N)\}P(N-1) \quad (30)$$

where N =1, 2, ..., a' (N) is an estimated value of the coefficient $a_{ij}$ of the roller mill characteristic model, x is a new value xjnew of the operating parameter, y(N) is a value yinew of the operating condition variable, and P(N) is the covariance of estimation errors.

The estimated values a' (N) of the coefficients aij of the roller mill characteristic model can be updated sequentially by the following Computation sequence when initial values a' (O) and P(O) =βI (β>>0) are used, By controlling the roller mill operating condition whilst continuously updating the roller mill characteristic model using the model updating unit 8, the operating condition of the roller mill 10 can be controlled taking into account the variation with time of the operating condition of the roller mill 10 and the variation of the properties of the feedstock, and, consequently, roller mill 10 can be maintained in an optimum operating condition. Furthermore, the synergetic effects of the updating of the roller mill characteristic model and the optimization using the index of performance enhance the speed of adjusting the operating condition of the roller mill 10 and the roller mill 10 can be quickly and automatically controlled for operation in an optimum operating condition.

Another example of the logical operating mode of the roller mill controller 1' will be described hereinafter.

In this logical operating mode, the roller mill characteristic model is updated by continuously updating part of the stored data and performing multiple regression analysis repeatedly. Basically, the roller mill controller 1' uses well-known multiple regression analysis when initially setting the coefficients aij of the roller mill characteristic model but uses it in a special way. This shall be explained with reference to FIG. 6.

Figure 6:
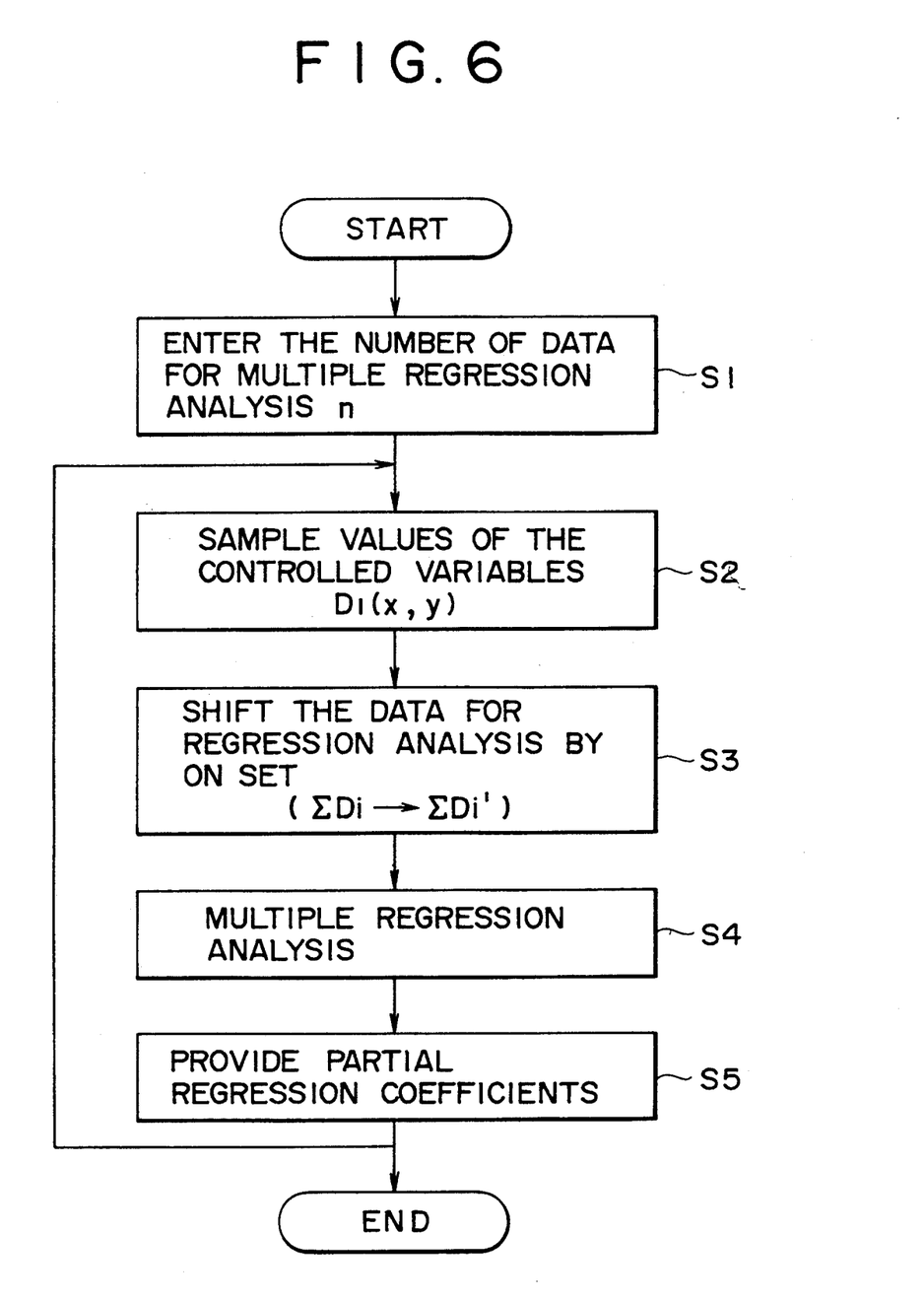
FIG. 6 is a flow chart of a control program to be carried out by the roller mill controller of FIG. 5.

Referring to FIG. 6, the number of data to be subjected to multiple regression analysis is entered in step SI by operating, for example, a keyboard (not shown). Operation data, $D_1$, consisting of the values of the operating condition variables, y, detected by the detecting unit 2 and new values of the corresponding operating parameters, x, are sampled in step S2. In step S3, each set of data of a data group $\Sigma D_i$; , which is stored in a memory, not shown, and is subjected to multiple regression analysis for determining initial values, is shifted after sampling the operation data $D_i$ to, produce a new data group $\Sigma D_i'$ for the next multiple regression analysis by removing the oldest operation data and adding the new sampled operation data $D_i$. In step S4, multiple regression analysis is performed using the data group $\Sigma D_i'$ and partial regression coefficients are calculated, and then the calculated new partial regression coefficients are provided as coefficients/$a_{ij}$ of the roller mill characteristic model in step S5. Steps S2 to S5 are repeated to update the roller mill characteristic model. The series of operations is controlled or executed by the model updating unit 8, the result of the use of this model updating unit 8 is equivalent to the result of the use of the Kalman filter. This procedure for updating the roller mill characteristic model is advantageous in that multiple regression analysis, which is the logic used for setting the initial values of the coefficients aij of the roller mill characteristic model, can be used.

Although the foregoing roller mill controllers use the roller mill control method [5], which uses the index of performance under the conditions that the restrictions are met, in practical application, the roller mill characteristic model may be updated, without using the index of performance (as in roller mill control method [4]). In this case, instead of the "selected new values of the operating parameters" obtained by using the index of performance, the values of the operating parameters that are determined by the roller mill characteristic model not optimized by updating are used as one part of the operating data, D1. Since the roller mill characteristic model is thus updated in accordance with the variation with time of the operating condition of the roller mill 10 and the variation of the properties of the feedstock, the roller mill 10 can be automatically controlled for optimum operation and the roller mill 10 can be operated always in optimum operating conditions, as similar to the roller mill control method [5]. The roller mill control methods [4] and [5] are different from the roller mill control methods [2] and [3] in that they optimize the operating condition of the roller mill 10 by eliminating offset instead of optimizing the operating condition of the roller mill 10 by optimizing the set values of the operating parameters. Therefore, the synergistic effects of the use of those roller mill control methods in combination are expected to bring about further excellent control of the roller mill 10.

Although, in the foregoing embodiments 1 and 2 of the present invention, both the values of the operating condition variables and the values of the operating parameters are used for the optimization of the operating condition of the roller mill when employing the restrictions and the index of performance, it is also possible to do so by only using either the values of the operating condition variables or the values of the operating parameters.

Although the changes in the values of the operating parameters are selected so that the index of performance is minimized or maximized in the foregoing first and second embodiments of the present invention, because the index of performance is determined so as to be minimized or maximized when the operating condition of the roller mill is optimized, after modifying the index of performance the changes in the values of the operating parameters may also be selected by finding those values which invert the convergence value of the index of performance.

The components of the roller mill controllers 1 and 1' in the first and second embodiments of the present invention may be either of the form of individual pieces of hardware or of the form of computer software processes.

As is apparent from the foregoing description, by using the roller mill controllers 1 and 1' in the first and second embodiments of the present invention it is possible to automatically run a roller mill in optimum operating conditions without the need to rely upon a skilled operator, even if the operating condition varies due to the variation of the crushing characteristics of the feedstock, through the general correction of the values of the operating parameters, which has been difficult to achieve by the conventional fuzzy control method. For example, the roller mill controllers 1 and 1' are able to suppress the vibrations of the roller mill 10 and are able to avoid the stoppage of the roller mill 10 due to the action of the vibration trip so that the roller mill operates continuously. Further, the roller mill controllers 1 and 1' control the roller mill 10 so that the roller mill 10 operates for the maximum throughput at a minimum unit power requirement and such that a product of optimum quality is produced.

As the present invention may be embodied in various embodiments other than those specifically describe herein without departing from the spirit of essential characteristics thereof, the present embodiments are therefore illustrative and not restrictive and, since the scope of the present invention is defined by the appended claims rather than by the preceding description, changes and modifications are possible in the invention without departing from the scope thereof.

What is claimed is:

1. A roller mill control method which controls an operating condition of a roller mill during operation thereof by adjusting values of operating parameters of the roller mill on the basis of values of operating condition variables representing the operating condition of the roller mill, said roller mill control method comprising the steps of:

repeatedly detecting the values of the operating condition variables representing the operating condition of the roller mill;

determining new values for the operating parameters by applying changes or ratios in the values of the operating condition variables to a roller mill characteristic model representing relation between changes or ratios in the values of the operating condition variables and changes or ratios in the values of the operating parameters; and selecting new values for the operating parameters, so as to optimize the operating condition of the roller mill.

2. A roller mill control method according to claim 1, wherein the operating condition variables at least include roller pressure applied to rollers of the roller mill.

3. A roller mill control method according to claim 1, wherein the operating parameters at least include feedstock feed rate.

4. A roller mill control method according to claim 1, wherein the operating parameters at least include a rotating speed of a separator of the roller mill.

5. A roller mill control method according to claim 1, wherein the operating parameters at least include a quantity of hot air blown into the roller mill.

6. A roller mill control method according to claim 1, wherein the operating condition variables at least include a mill pressure difference.

7. A roller mill control method according to claim 1, wherein a operating condition variables include at least a particle size distribution of the product.

8. A roller mill control method according to claim 1, wherein the operating condition variables include at least a power requirement of the roller mill.

9. A roller mill control method according to claim 1, wherein the operating condition variables include at least a mill vibration.

10. A roller mill control method according to claim 1, wherein said roller mill characteristic model is the following determinant:

$$\begin{pmatrix} \Delta y_1 \\ \Delta y_2 \\ \Delta y_3 \\ \Delta y_4 \end{pmatrix} = \begin{pmatrix} a_{11} a_{12} a_{13} a_{14} \\ a_{21} a_{22} a_{23} a_{24} \\ a_{31} a_{32} a_{33} a_{34} \\ a_{41} a_{42} a_{43} a_{44} \end{pmatrix} \begin{pmatrix} \Delta x_1 \\ \Delta x_2 \\ \Delta x_3 \\ \Delta x_4 \end{pmatrix}$$

where $x_1$: Roller pressure (Pressure of a working fluid)
$x_2$: Feedstock feed rate
$x_3$: Rotating speed of a separator
$x_4$: Quantity of hot air supplied to the mill
$y_1$: Mill pressure difference
$y_2$: Particle size distribution of product
$y_3$: Power requirement
$y_4$: Mill vibration.

11. A roller mill control method according to claim 10, wherein the elements $a_{11}$ to $a_{44}$ of the determinant are coefficients determined by subjecting time averages of the values of the operating condition variables $x_i$ and the values of the operating parameters $y_i$ sampled at fixed sampling times to multiple regression analysis.

12. A roller mill control method according to claim 1, wherein the operating condition variables include at least 90%-pass particle size.

13. A roller mill control method according to claim 1, wherein said roller mill characteristic model is the following determinant:

$$\begin{pmatrix} \Delta' y_1 \\ \Delta' y_2 \\ \Delta' y_3 \end{pmatrix} = \begin{pmatrix} a_{11} a_{12} a_{13} a_{14} \\ a_{21} a_{22} a_{23} a_{24} \\ a_{31} a_{32} a_{33} a_{34} \end{pmatrix} \begin{pmatrix} \Delta' x_1 \\ \Delta' x_2 \\ \Delta' x_3 \\ \Delta' x_4 \end{pmatrix}$$

where $x_1$: Roller pressure (Pressure of a working fluid)
$x_2$: Feedstock feed rate
$x_3$: Rotating speed of a separator
$x_4$: Quantity of hot air supplied to the mill
$y_1$: 90%-pass particle size
$y_2$: Power requirement
$y_3$: Mill vibration.

14. A roller mill control method according to claim 1, wherein the operating condition variables include at least a Blaine value.

15. A roller mill control method according to claim 1, wherein the operating condition variables include at least a variable obtained by dividing a crushing rate by a power requirement.

16. A roller mill control method according to claim 1, wherein the operating condition variables include at least a thickness of a layer of crushed feedstock formed on a rotary table of the roller mill.

17. A roller mill control method according to claim 1, wherein the operating condition variables include at least a range of variation of a thickness of a layer of crushed feedstock formed on a rotary table of the roller mill.

18. A roller mill control method according to claim 1, wherein the operating parameters include at least a crushing rate.

19. A roller mill control method according to claim 1, wherein the operating parameters include at least a rotating speed of a rotary table of the roller mill.

20. A roller mill control method according to claim 1, wherein said roller mill characteristic model is represented by the following determinant:

$$\Delta y_i = \sum_{j=1}^{5} a_{ij} \Delta x_j \quad (i = 1 \text{ to } 6)$$

where $x_1$: Roller pressure (Pressure of a working fluid)
$x_2$: Crushing rate
$x_3$: Rotating speed of a separator
$x_4$: Quantity of hot air supplied to the mill
$x_5$: Rotating speed of a rotary table
$y_1$: Blaine value
$y_2$: AJS 30 $\mu$ residue value
$y_3$: Crushing rate/power requirement
$y_4$: Pressure difference
$y_5$: Thickness of a layer of crushed feedstock
$y_6$: Range of a variation of the thickness of the layer of crushed feedstock.

21. A roller mill control method which controls an operating condition of a roller mill during operation thereof by adjusting values of operating parameters of the roller mill on a basis of values of operating condition variables representing the operating condition of the roller mill, said roller mill control method comprising the steps of:

repeatedly detecting the values of the operating condition variables representing the operating condition of the roller mill; and selecting new values for the operating parameters which optimize an index of performance for evaluating the values of the operating condition variables and/or the values of the operating parameters, under the condition that certain predetermined restrictions on the detected values of the operating condition variables and/or the new values of the operating parameters are met.

22. A roller mill control method according to claim 21, wherein said restrictions at least include a condition requiring that a sums of a value of each operating parameter and changes in the value of the same operating parameter are within fixed ranges.

23. A roller mill control method according to claim 21, wherein said restrictions at least include a condition requiring that sums of a value of each operating condition variable and a variation in the value of the same operating condition variables are within fixed ranges.

24. A roller mill control method according to claim 21, wherein said restrictions at least include a condition requiring that sums of a value of each operating condition variable, and a value obtained by multiplying a ratio of the value of the operating condition variable and a variation in the value of the same operating condition variable by the value of the same operating condition variable are within fixed ranges.

25. A roller mill control method according to claim 21, wherein said restrictions at least include a condition requiring that sums of a value of each operating condition variable and a value obtained by multiplying a ratio of the value of the operating condition variable and a change in the value of the same operating condition variable by a value obtained by subtracting a fixed value from the value of the same operating condition variable are within fixed ranges.

26. A roller mill control method according to claim 21, wherein the new values of the operating parameters are selected by Simplex method so as to optimize an index of performance.

27. A roller mill control method which controls an operating condition of a roller mill during operation thereof by adjusting values of operating parameters of the roller mill on a basis of values of operating condition variables representing the operating condition of the roller mill, said roller mill control method comprising the steps of:
repeatedly detecting the values of the operating condition variables representing the operating condition of the roller mill;
determining new values for the operating parameters by applying variations or ratios in the detected values of the operating condition variables to a roller mill characteristic model representing a predetermined relation between variations or ratios in the values of the operating condition variables and changes or ratios in the values of the operating parameters; and
selecting new values for the operating parameters so as to optimize an index of performance for evaluating the values of the operating condition variables and/or the values of the operating parameters, under a condition that certain predetermined restrictions on the detected values of the operating condition variables and/or the new values of the operating parameters are met.

28. A roller mill control method which controls an operating condition of a roller mill during operation thereof by adjusting values of the operating parameters of the roller mill on a basis of values of operating condition variables representing the operating condition of the roller mill, said roller mill control method comprising steps of:
repeatedly measuring the values of the operating condition variables representing the operating condition of the roller mill;
determining new values for the operating parameters by applying variations or ratios in the detected values of the operating condition variables to a roller mill characteristic model representing a predetermined relation between variations or ratios in the values of the operating condition variables and changes or ratios in the values of the operating parameters; and
updating the roller mill characteristic model on a basis of the new values of the operating parameters and the values of the operating condition variables detected after operating the roller mill according to the new values of the operating parameters.

29. A roller mill control method according to claim 28, wherein the roller mill characteristic model is updated by condition estimation using a Kalman filter.

30. A roller mill control method according to claim 28, wherein sequential approximation is applied to identification of parameters by a least squares method when updating the roller mill characteristic model.

31. A roller mill control method according to claim 28, wherein the roller mill characteristic model is updated by repeating multiple regression analysis, whilst partially updating the stored data.

32. A roller mill control method according to claim 31, wherein the updating of the roller mill characteristic model through multiple regression analysis comprises:
a first step of entering a number of variables to be subjected to multiple regression analysis;
a second step of sampling operation data including the detected values of the operating condition variables and the new values of the operating parameters;
a third step of producing a new data group for the next multiple regression analysis after sampling the operation data, by shifting one set of the data group, stored for multiple regression analysis for determining initial values, removing the oldest operation data and adding the new operation data;
a fourth step of calculating partial regression coefficients by carrying out the multiple regression analysis of the data group for multiple regression analysis;
a fifth step of incorporating the calculated new partial regression coefficients as the coefficients of the roller mill characteristic model; and
a sixth step of updating the roller mill characteristic model by repeating all steps from the second step through to the fifth step, inclusively.

33. A roller mill control method which controls the operating condition of a roller mill by adjusting the values of the operating parameters of the roller mill on the basis of the values of the operating condition variables representing the operating condition of the roller mill, said roller mill control method comprising steps of:
repeatedly measuring the values of the operating condition variables representing the operating condition of the roller mill;
determining new values for the operating parameters by applying detected variations or ratios in the values of the operating condition variables to a roller mill characteristic model representing the predetermined relation between variations or ratios in the values of the operating condition variables and changes or ratios in the values of the operating parameters;
selecting new values for the operating parameters so as to optimize an index of performance for evaluating the values of the operating condition variables and/or the values of the operating parameters, under the condition that certain predetermined restrictions on the detected values of the operating condition variables and/or the new values of the operating parameters are met; and updating the roller mill characteristic model on the basis of the selected new values of the operating parameters and the values of the operating condition variables detected after attempting to control the operating condition of the roller mill using the selected new values of the operating parameters.

34. A roller mill control method according to claim 33, wherein the roller mill characteristic model is updated by condition estimation using a Kalman filter.

35. A roller mill control method according to claim 33, wherein sequential approximation is applied to identification of parameters by a least squares method when updating the roller mill characteristic model.

36. A roller mill control method according to claim 33, wherein the roller mill characteristic model is updated by repeating multiple regression analysis, whilst partially updating stored data.

37. A roller mill control method which controls a operating condition of a roller mill by adjusting values of operating parameters of the roller mill on the basis of values of operating condition variables representing the operating condition of the roller mill, said roller mill control method comprising steps of:

repeatedly measuring the values of the operating condition variables representing the operating condition of the roller mill;

determining new values for the operating parameters by applying detected variations or ratios in the values of the operating condition variables to roller mill characteristic models representing the predetermined relation between variations or ratios in the values of the operating condition variables and changes or ratios in the values of the operating parameters; and adjusting the values of the operating parameters so that the values of the corresponding operating condition variables coincide with the desired values.

38. A roller mill control method according to claim 37, wherein at least one of said models includes a linear expression expressing one of the operating condition variables as a function of a plurality of the operating parameters.

39. A roller mill control method according to claim 37, wherein at least one of said models includes a linear expression expressing one of the operating condition variables as a function of a plurality of the operating parameters, and at least one of said models, other than said model including a linear expression, includes a determinant for multiple regression analysis, representing the values of the operating condition variables.

40. A roller mill control method according to claim 37, wherein the variables of said model are dimensionless.

* * * * *